US006954981B2

(12) United States Patent
Suzuki

(10) Patent No.: US 6,954,981 B2
(45) Date of Patent: Oct. 18, 2005

(54) WIRE CONNECTION APPARATUS

(75) Inventor: Satoshi Suzuki, Tokyo (JP)

(73) Assignee: Tyco Electronics AMP, K.K., Kanagawa (JP)

( * ) Notice: Subject to any disclaimer, the term of this patent is extended or adjusted under 35 U.S.C. 154(b) by 434 days.

(21) Appl. No.: 10/226,784

(22) Filed: Aug. 23, 2002

(65) Prior Publication Data

US 2003/0045156 A1 Mar. 6, 2003

(30) Foreign Application Priority Data

Aug. 30, 2001 (JP) ....................................... 2001-261535

(51) Int. Cl.[7] .......................... B23P 19/00; H01R 43/00

(52) U.S. Cl. ............................. 29/748; 29/747; 29/749; 29/752; 29/759; 29/33 M; 29/866

(58) Field of Search ..................... 72/712, 416, 409.14; 29/747–749, 759, 876, 866, 33 M, 566.3, 566.4, 566.1, 752; 439/404, 597

(56) References Cited

U.S. PATENT DOCUMENTS 4,590,650 A * 5/1986 Brown et al. .............. 29/33 M
4,965,923 A * 10/1990 Kumazawa ................ 29/566.3
5,355,583 A * 10/1994 Osumi et al. ................. 29/876
2003/0045156 A1 * 3/2003 Suzuki ....................... 439/404

FOREIGN PATENT DOCUMENTS

JP 10-194694 7/1998 ........... H01R/43/01
JP 2003-77610 * 3/2003

* cited by examiner

*Primary Examiner*—Minh Trinh
(74) *Attorney, Agent, or Firm*—Barley Snyder LLC

(57) ABSTRACT

A wire connection apparatus having a connector holder, a press-contacting device such as a stuffer, and a guide member. The wire connection apparatus has a wire end alignment mechanism which includes a vertical surface of the connector holder, the press-contacting device and the guide member. In operation, the press-contacting device moves along the vertical surfaces of the connector holder and presses wires into the connector while unaligned tips of the wires abut the vertical surface. As the tips of the wires are pressed by the press-contacting device, excess lengths of the wires are moved upstream through the fixed wire guide. When the wires are at an appropriate length, they are press-contacted by the press-contacting device and connected to the connector.

15 Claims, 10 Drawing Sheets

WIRE CONNECTION APPARATUS

FIELD OF THE INVENTION

The present invention relates generally to a wire insulation displacement connection apparatus. The present invention relates in particular to a wire insulation displacement connection apparatus with a wire end alignment mechanism for aligning the tips of wires when the wires are press-contacted into a connector.

BACKGROUND OF THE INVENTION

A wire insulation displacement connection apparatus, or connector press-contacting apparatus, with a wire end alignment mechanism is described in Japanese Patent No. 2997667. The connector press-contacting apparatus includes a connector holder having an end-aligning inclined surface against which the wire tips abut. Alignment of the wire tips is achieved by pushing the wires in the direction of their horizontal axes along the end-aligning inclined surface at the same time as a stuffer presses the wires toward a connector held by the connector holder in order to press-contact the wires to the connector.

The stuffer presses the wires at a position slightly removed from the tips of the wires during the alignment of the wire tips. This is to avoid interference (collisions) between the stuffer and the end-aligning inclined surface. However, this causes the wire tips, which are not pressed by the stuffer, to remain on the end-aligning inclined surface due to friction. As a result, the stuffer exerts pressure on the wire tips and causes the wire tips to bend leading to the possibility that proper press-contact connections are not made.

SUMMARY OF THE INVENTION

It is an object of the present invention to accurately press-contact wires to connectors by preventing the ends of the wire tips from bending during the press-contacting procedure.

A wire insulation displacement connection apparatus according to the present invention comprises a connector holder for holding a connector, a press-contacting portion for press-contacting the tips of a plurality of wires, which are arranged in parallel, by means of a stuffer; and a wire end alignment mechanism for aligning the tips of the wires. The tips of the wires are arranged such that they align with, terminals of the connector. The end aligning mechanism comprises a vertical surface on the connector holder that the tips of the wires abut. The stuffer pushes the end portions of the wires, including the tips of the wires that abut the vertical surface, into the connector along the vertical surface. A guide member guides the wires in their longitudinal direction such that the wires are movable in the longitudinal direction as the tips are pushed in along the vertical surface by the stuffer.

Further, it is preferable that a wire holding position of the guide member is at the same height or higher than the position of the connector held by the connector holder.

The tip alignment mechanism of the wire insulation displacement connection apparatus with a tip alignment mechanism according to the present invention comprises a vertical surface for the wire tips to abut, a stuffer for pressing the wire tips which abut against the vertical surface into a connector along the vertical surface, and a guide member for guiding the movement of the wires. When the wire tips are pressed by the stuffer, the wire tips are pressed in along the vertical surface, and are pushed back in the longitudinal direction of the wires through the guide member. In this manner, the ends of the wires are prevented from bending and accurate press-contacting of the wires to terminals of a connector in a state in which the wire tips are aligned is possible.

In the embodiment wherein the wire holding position of the guide member is at the same height or higher than the position of the connector held by the connector holder, a sufficient length of wire can be provided to the press-contact portion of the connector terminals. In this manner, there is little or no possibility of press-contact deficiencies, and positive and accurate press-contacting of the wires to the connector terminals is possible.

BRIEF DESCRIPTION OF THE DRAWINGS

The invention will now be described by way of example with reference to the accompanying figures of which:

FIGS. 9A, 9B, 9C and 9D show the second applicator, wherein FIG. 9A is a side view of the second applicator, FIG. 9B is a cross sectional view of the second application, FIG. 9C is a partial magnified side view of the comb blades of the second applicator, and FIG. 9D is a partial magnified front view of the comb blades of the second applicator.

DESCRIPTION OF THE PREFERRED EMBODIMENTS

Embodiments of the wire insulation displacement connection apparatus with a mechanism for aligning wire tips according to the present invention will now be described in detail with reference to the attached figures wherein the left side is designated as upstream and the right side is designated as downstream.

Figure 1:
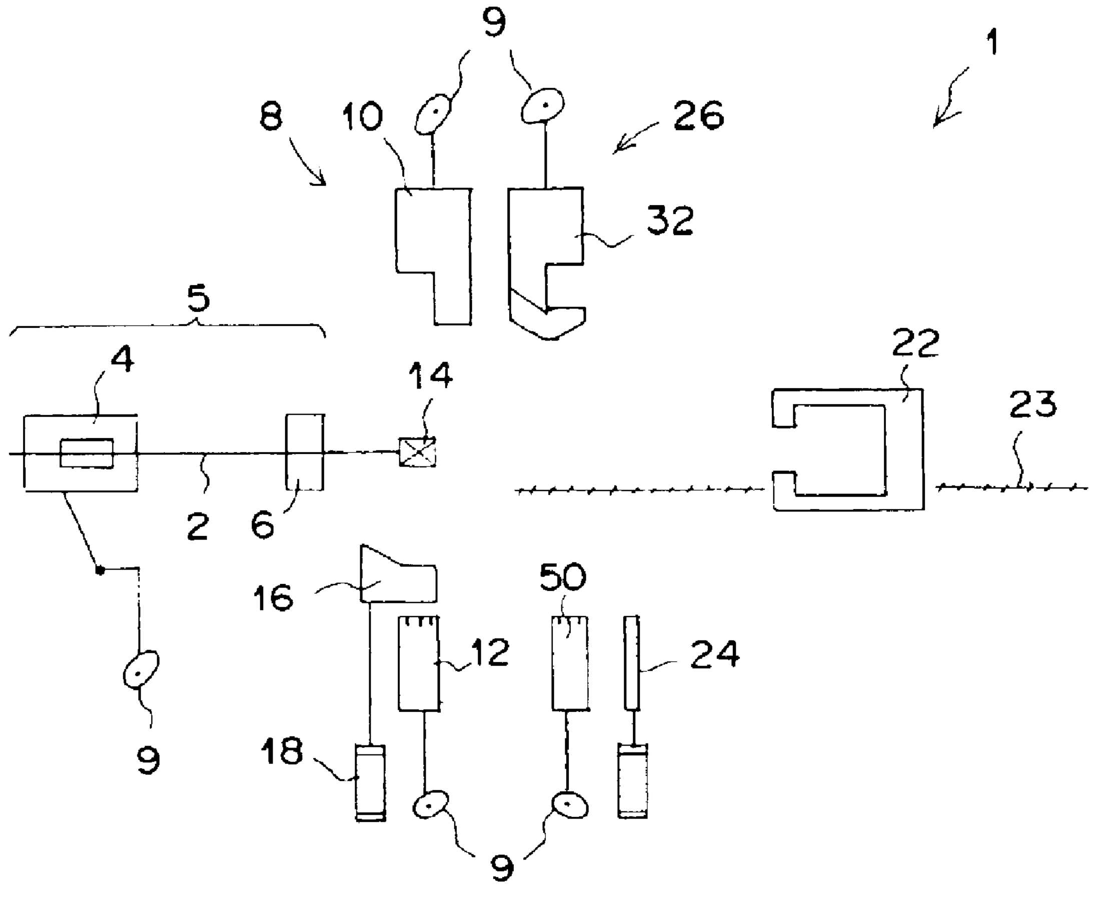
FIG. 1 is a schematic view of a wire insulation displacement connection apparatus according to the present invention after a first connector has been press-contacted.
Figure 8:
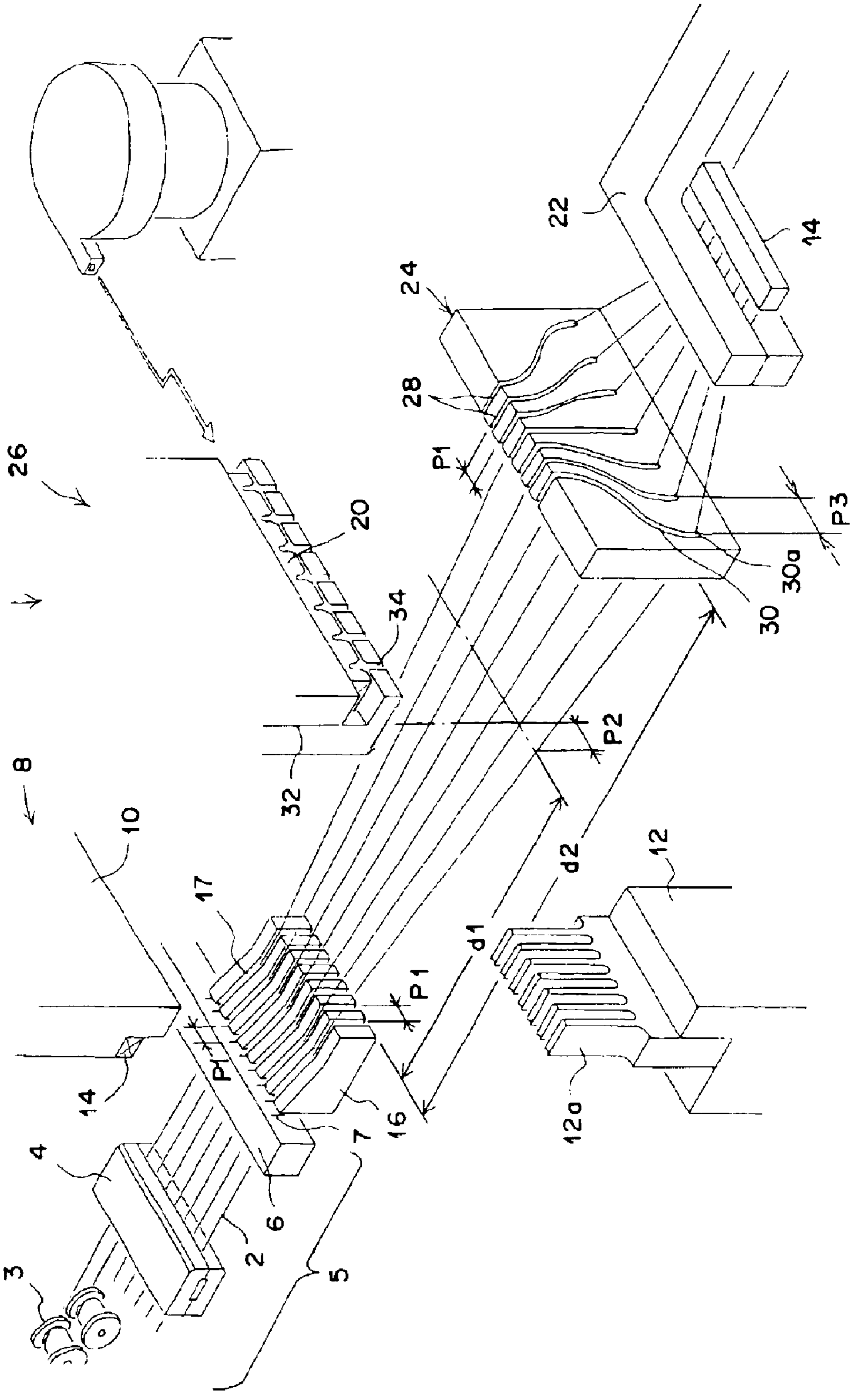
FIG. 8 is a schematic perspective view of the main parts of the press-contacting apparatus of the present invention.

Referring first to FIG. 1, a press-contacting apparatus 1 in accordance with the invention has a fixed wire guide 6 that acts as a guide member for aligning wires 2 at a first pitch P1, a first press-contacting portion 8 situated downstream from the fixed wire guide 6 and a second press-contacting portion 26 situated further downstream from the first press-contacting portion 8. The first press-contacting portion 8 includes an applicator 10 and a stuffer 12. The second press-contacting portion 26 also includes an applicator 32 and a stuffer 50. The wires 2 are supplied from a wire supply source 3 (as shown in FIG. 8) such as a reel or other suitable wire storage constructions. The wires 2 are supplied downstream along the wire path via a wire pullback clamp 4 and the fixed wire guide 6 situated downstream from the wire pullback clamp 4. The wire supply source 3, the wire pullback clamp 4 and the fixed wire guide 6 are collectively referred to as a wire supply portion 5. The fixed wire guide 6 has guide grooves 7 (as shown in FIG. 8) at a first pitch P1, i.e., at a first distance from one another. The applicator 10, the applicator 32, the stuffer 12, the stuffer 50 and the wire pullback clamp 4 are each driven separately by cams 9.

A first connector 14 at the tips of the wires 2 is press-contacted by the first press-contacting portion 8 of the press-contacting apparatus 1. The first press-contacting portion 8 press-contacts and connects the first connector 14 by means of the applicator 10 arranged above the wires 2 and the stuffer 12 arranged below the wires 2. More specifically, the applicator 10 holds the first connector 14 above the wires 2 while the stuffer 12 has a press-contact blade **12*a* whereby the applicator 10 and stuffer 12 approach each other with the wires 2 being situated between them. The press-contact blades 12*a* push the wires 2 into the terminals of the first connector 14 the thereby form a press-contact connection between the wires 2 and the first connector 14**.

A movable wire guide 16 has guide grooves 17 at the first pitch P1 and is arranged on the same side of the wires 2 as the stuffer 12. The movable wire guide 16 is arranged to be insertable into the path of the wires 2 by a cylinder 18, which is operated by air pressure, hydraulic pressure or other suitable pressure providing fluids. The movable wire guide 16 performs positive positioning of the wires 2 when they are press-contacted to terminals (not shown) of the first connector 14. The press-contact blade **12*a* is inserted within the guide grooves 17 and press-contacts the wires 2 within the guide grooves 17 to the connector 14. The term "press-contact" refers to press-fitting wires 2 into wire receiving grooves of terminals (not shown) of the connector 14, tearing the insulative coatings of the wires 2 and electrically connecting the conductors (not shown) within the wires 2** to the terminals. The electrical connection procedure is well-known to those skilled in the art and therefore a detailed description of the electrical connection procedure is not provided herein.

Figure 2A:
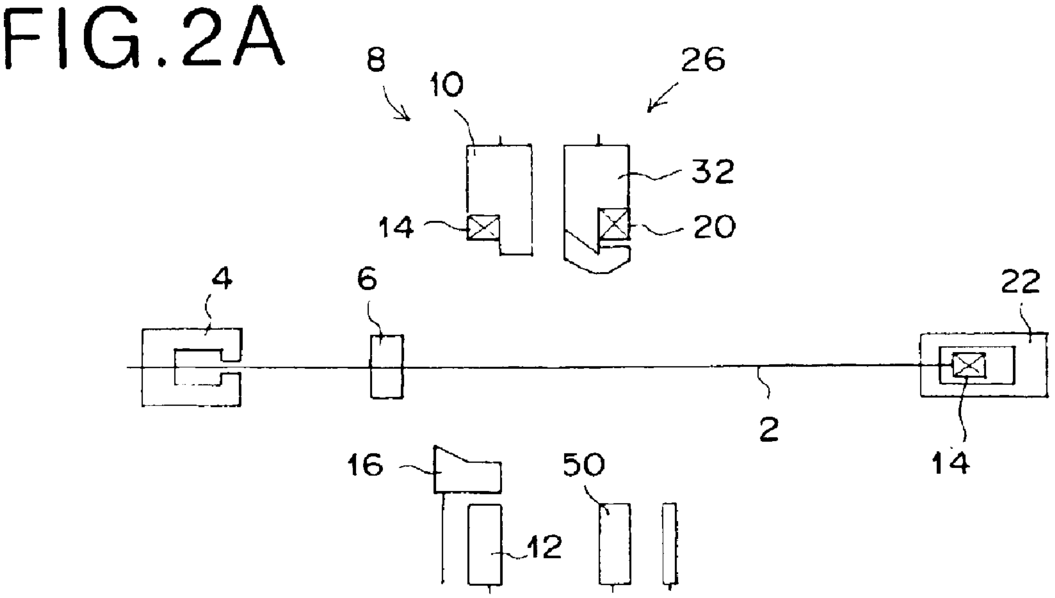
FIG. 2A is a schematic view of the wire insulation displacement connection apparatus according to the present invention showing the press-contacted first connector having been moved downstream by a clamp.
Figure 2B:
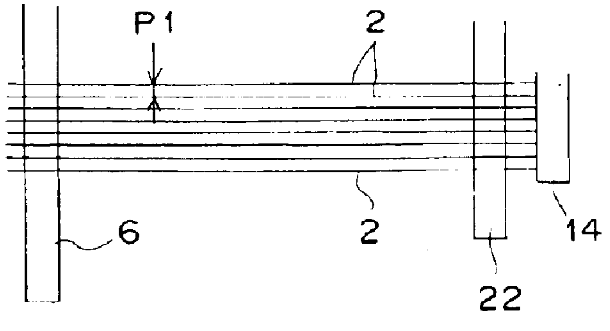
FIG. 2B is a schematic plan view of the wire insulation displacement connection apparatus showing the press-contacted first connector having been moved downstream by the clamp.

After the wires 2 are press-contacted and connected to the first connector 14, a measuring clamp 22 positioned downstream along the wire path is moved upstream by a moving means such as a bore screw 23. The measuring clamp 22 grasps the wires 2 in the vicinity of the first connector 14, and moves the first connector 14 downstream, as shown in FIG. 2A. At this time, the measuring clamp 22 measures the wires 2. The length of the wires 2 measured by the measuring clamp 22 ultimately becomes the length of a wire harness with connectors at both ends. At this time, the plurality of wires 2 are arranged parallel at intervals of the first pitch P1, as shown in FIG. 2B. In FIGS. 2A and 2B, the measuring clamp 22 is shown grasping the wires 2 in the vicinity of the first connector 14. However, a structure may be adopted wherein the measuring clamp 22 grasps the first connector 14 itself.

Figure 3A:
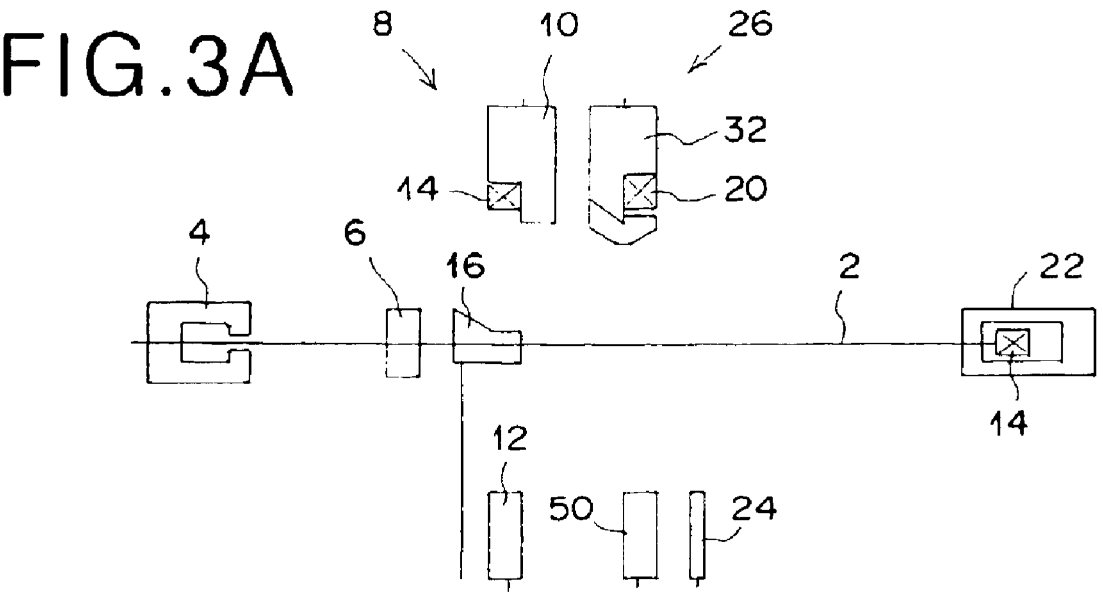
FIG. 3A is a schematic view of the wire insulation displacement connection apparatus showing a movable wire guide inserted into the wires.
Figure 3B:
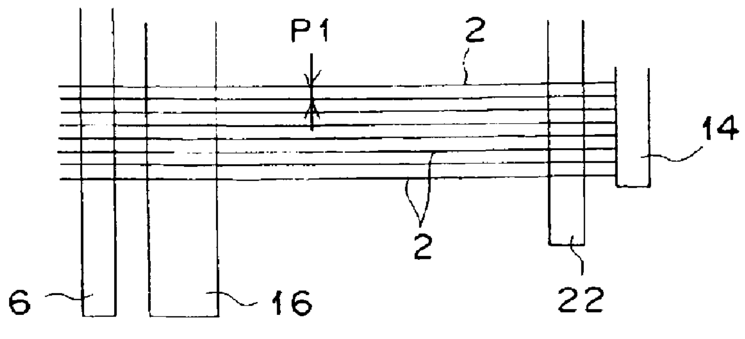
FIG. 3B is a schematic plan view of the wire insulation displacement connection apparatus in which the movable wire guide is inserted into the wires.

After the wires 2 have been pulled out a predetermined length as shown in FIGS. 2A and 2B, a second connector 20 is press-contacted on the upstream side of the wires 2. Prior to the press-contacting of the second connector 20, the movable wire guide 16 is inserted into the row of the wires 2 as shown in FIGS. 3A and 3B. The wires 2 are accurately maintained at the first pitch P1 as shown in FIG. 3B.

Figure 4A:
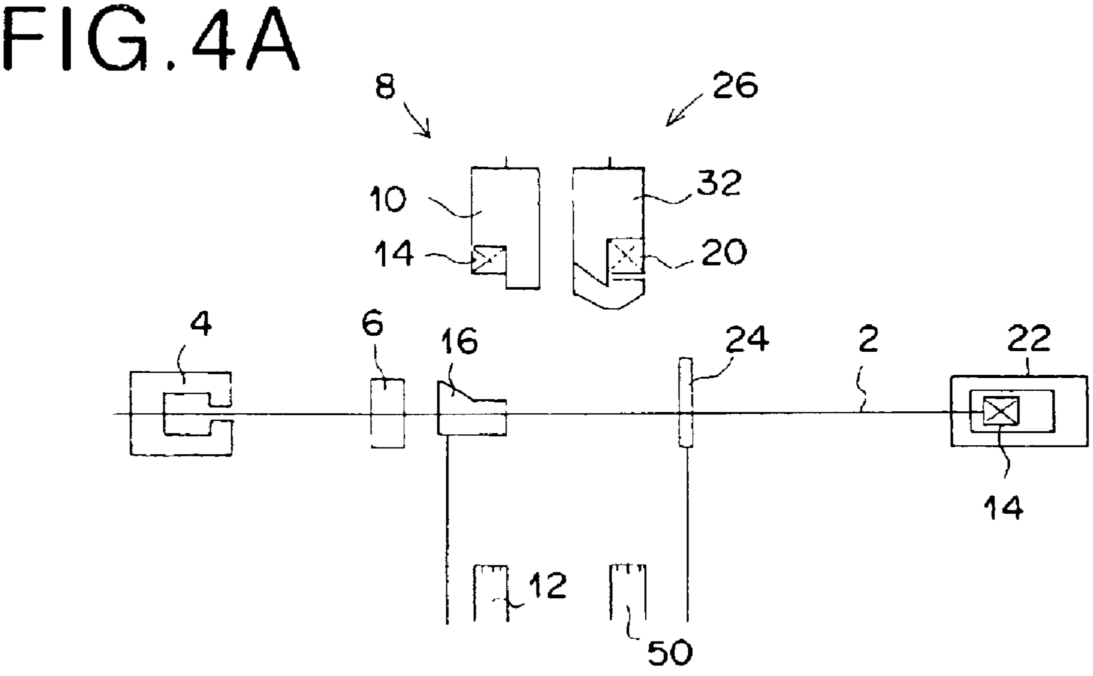
FIG. 4A is a schematic plan view of the wire insulation displacement connection apparatus showing a pitch conversion comb blade inserted into the wires.
Figure 4B:
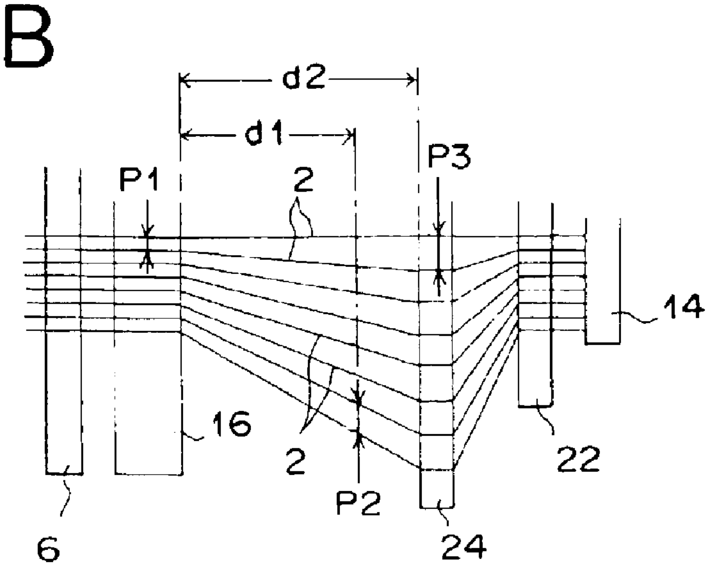
FIG. 4B is a schematic plan view of the wire insulation displacement connection apparatus showing the pitch of the wires when the pitch conversion comb blade is inserted into the wires.

Next, as shown in FIGS. 4A and 4B, a pitch converting comb blade (pitch conversion mechanism) 24, for converting the arrangement pitch of the wires 2, is inserted into the wires 2 downstream of the second press-contacting portion 26. The pitch converting comb blade 24 will be described in detail with reference to FIG. 8. The pitch converting comb blade 24 is formed as a rectangular plate which is substantially perpendicular to the wire path. A plurality of wire-receiving openings 28 arranged at the first pitch P1 are provided at the upper edge of the comb blade 24. The wire-receiving openings 28 extend downward and spread outward to thereby form pitch conversion grooves 30 which are open in the direction of the wire path. The intervals between the pitch conversion grooves 30 at their lower ends **30*a* are at a third pitch P3, which is wider than the first pitch P1**.

Accordingly, the intervals between the wires 2 which are inserted into the wire receiving openings 28 widen as the pitch converting comb blade 24 rises, as shown in FIG. 4B. When the pitch conversion is complete, the intervals become the third pitch P3. The wires 2 between the movable wire guide 16 of the first press-contacting portion 8 and the pitch converting comb blade 24 are arranged such that the intervals between the wires increase from the first pitch P1 to a third pitch P3. At this time, it is important that the third pitch P3 is set in advance such that the intervals between the wires 2 in the region of the second press-contacting portion 26 for press-contacting the second connector 20 is equal to a second pitch P2 of the second connector 20.

The positional relationship between the first press-contacting portion 8, the second press-contacting portion 26, and the pitch converting comb blade 24 is expressed by the following equation. That is, the equation $$P3=d2(P2-P1)/d1+P1$$

is satisfied, wherein d1 is the distance between the first press-contacting portion 8 and the second press-contacting portion 26, as shown in FIG. 4B and FIG. 8, d2 is the distance between the first press-contacting portion 8 and the pitch converting comb blade 24, which acts as the pitch conversion mechanism. In addition, P2 is the arrangement pitch of the terminals of the second connector 20 of the second press-contacting portion 26. In the illustrated embodiment, the distances d1 and d2 from the first press-contacting portion 8 is the distance from the downstream edge of the movable wire guide 16. In embodiments wherein the movable wire guide 16 is not utilized, the center of the first press-contacting portion 8 in the direction of the wire path becomes the starting point of the distance.

After the wires 2 have been arranged by the pitch converting comb blade 24 in the manner as shown in FIG. 4B, the applicator 32 of the second press-contacting portion 26 is inserted into the wires 2 from a location above the wires. At this time, the wires 2 are guided and inserted into slots 34 which are arranged to align with terminals (not shown) of the second connector 20 held by the applicator 32. The method by which the wires 2 are guided and positioned by the applicator 32 will be described with reference to FIGS. 9A–9D.

Figure 5A:
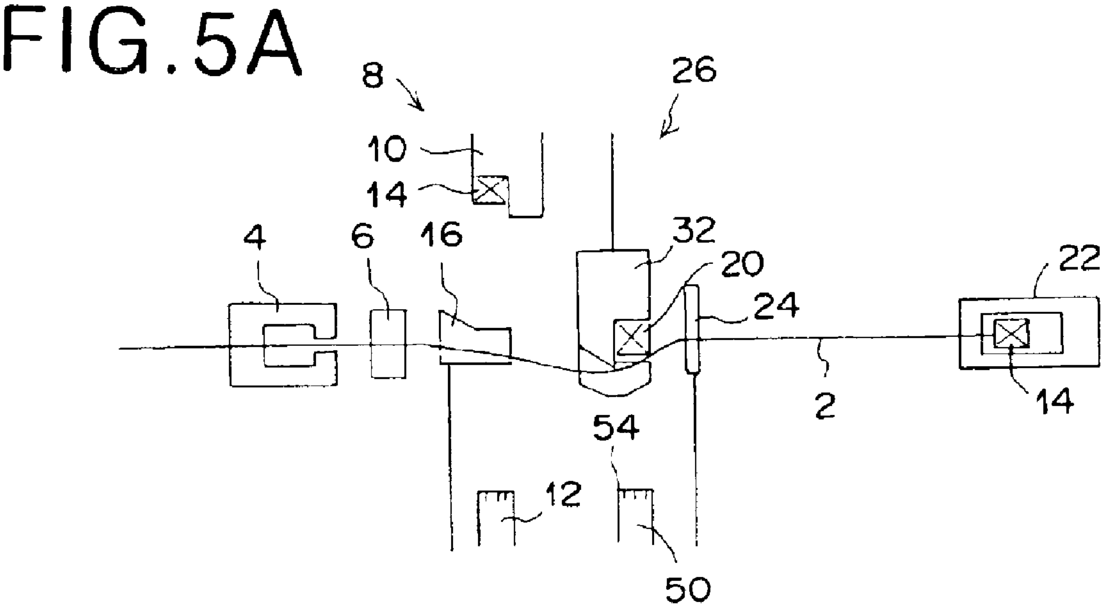
FIG. 5A is a schematic view of the wire insulation displacement connection apparatus showing a second applicator that holds a second connector inserted into the wires.
Figure 9A:
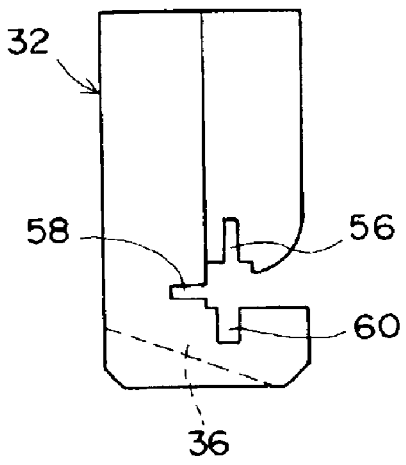
Figure 9B:
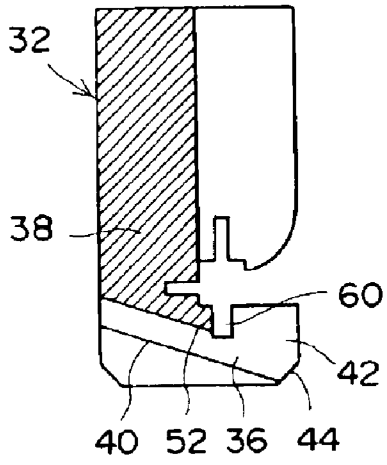
Figure 9C:
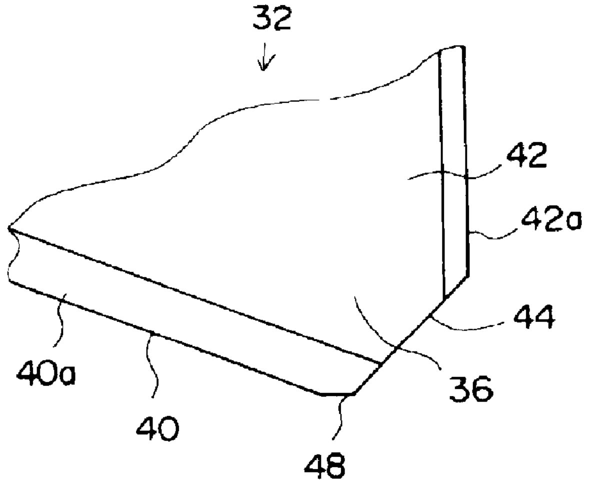
Figure 9D:
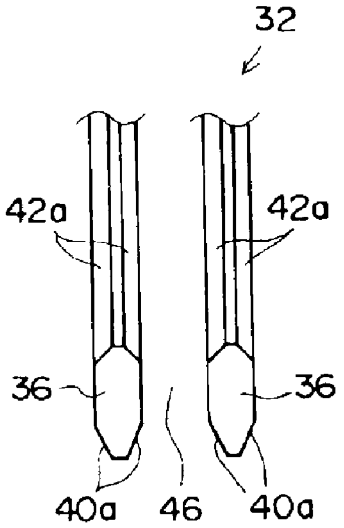

As shown in FIG. 9A, a plurality of comb blades 36 for arranging the wires onto the terminals of the second connector 20 are arranged at the tip of the applicator 32. Each comb blade 36 is provided as a plate that extends downward from a base 38 of the applicator 32, and has a front edge 40 that inclines downward towards the downstream side, and a tongue piece 42 integrally formed thereon. During the press-contact procedure, the stuffer 50 (see FIG. 5A) passes between adjacent tongue pieces 42. Bevels **40*a* and 42*a* are formed on both sides of the edges of the tongue pieces 42, as shown in FIG. 9C. In addition, inclined surfaces 44 are formed at the corners of the tongue pieces 42**.

When the applicator 32 descends to be inserted into the wires 2, the bevels **40*a* and 42*a* guide the wires 2 smoothly into slots 46 of adjacent comb blades 36. Further, sharp tips 48 formed by the inclined front edges 40 and the inclined surfaces 44 are formed on the wider side of the arrangement pitch of the wires 2, thereby reducing the possibility of interference with the wires 2 when receiving the wires 2. These bevels 40*a*, 42*a*, the front edge 40 and the inclined surface 44 are collectively referred to as a taper. Cutouts 56 and 58 are provided to avoid interference of tines (not shown) of the terminals (not shown) of the second connector 20. In addition, cutouts 60 are provided such that a shearing blade can be formed on the applicator 32**.

Figure 5B:
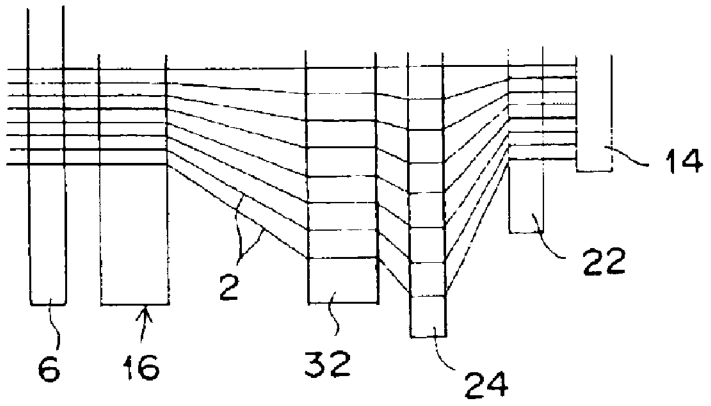
FIG. 5B is a schematic plan view of the wire insulation displacement connection apparatus when the second applicator which holds the second connector is inserted into the wires.

Referring back to FIGS. 5A and 5B, when the wires 2 are arranged to align 10 with the terminals of the second connector 20 as shown in FIG. 5A, the wires 2 are arranged parallel within the slots 46 of the applicator 32, and the wires 2 are accurately press-contacted onto the terminals of the second connector 20. Unlike conventional designs, there is no wire-arranging member for the applicator 32 between the movable wire guide 16 and the applicator 32. Therefore, the wires 2 extending from the movable wire guide 16 are not pulled at a sharp angle. Accordingly, the insulative coating, that is, the outer coating, of the wires 2 is prevented from being damaged at the downstream exit of the movable wire guide 16.

Figure 6:
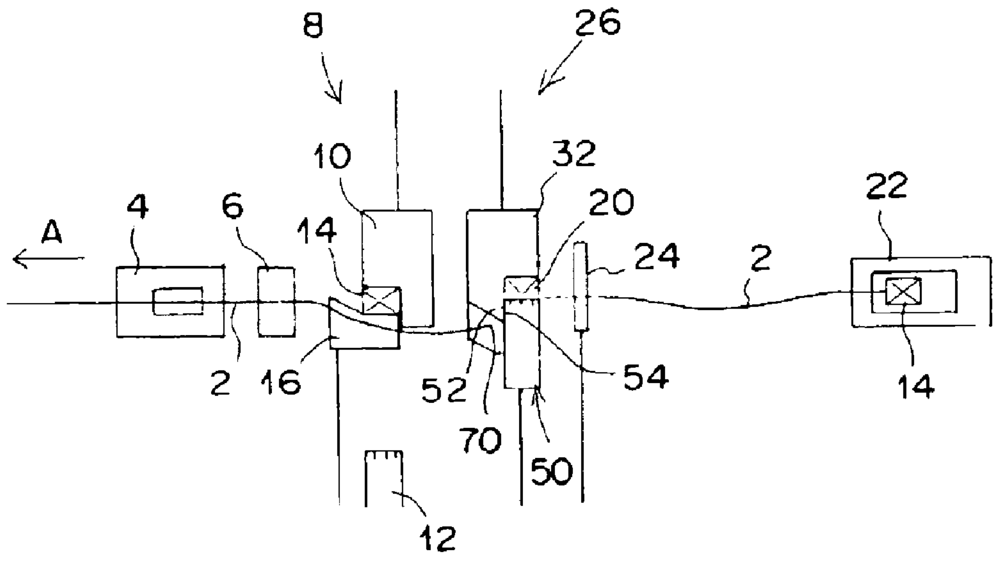
FIG. 6 is a schematic view of the wire insulation displacement connection apparatus showing the wires press-contacted to the second connector by a stuffer.

As shown in FIG. 6, the stuffer 50 approaches the applicator 32 from a location below the wires 2, and press-contacts the wires 2 onto the second connector 20. At this time, the wires 2 are cut by the cooperation of a shearing blade 52 of the applicator 32 and a shearing edge 54 of the stuffer 50. In this manner, a wire harness which has two connectors 14 and 20 press-contacted to the ends of the wires 2 is completed. A wire harness expelling apparatus (not shown) expels the wire harness.

Figure 7:
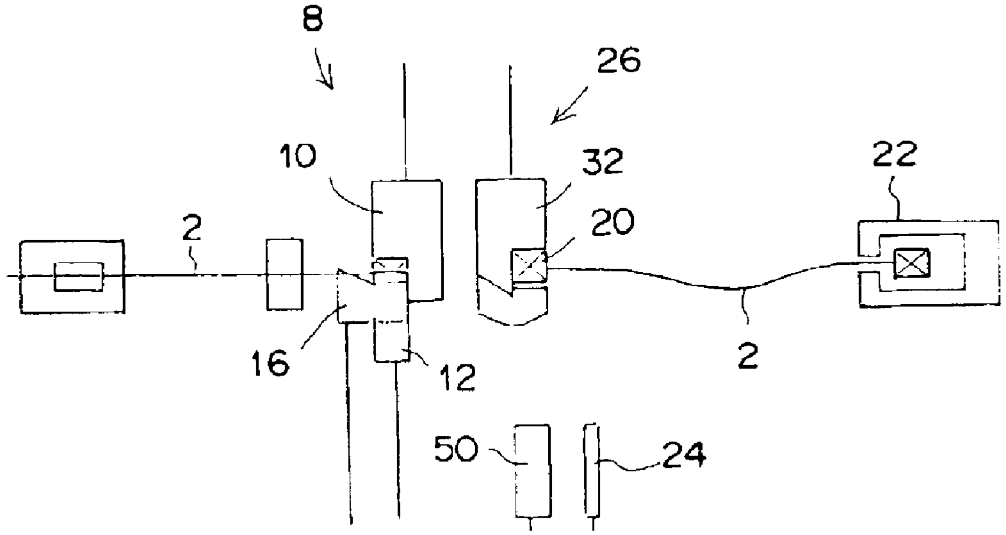
FIG. 7 is a schematic view of the wire insulation displacement connection apparatus showing the wires press-contacted to a subsequent first connector.

To continue the manufacture of wire harnesses, the applicator 10 of the first press-contacting portion 8, on which is mounted a first connector 14 for the subsequent wire harness, is lowered, and the wires 2 guided by the movable wire guide 16 are arranged to align with terminals (not shown) of the first connector 14. Thereafter, the pullback clamp 4 moves in the upstream direction indicated by the arrow A in FIG. 6, to pull back the tips 70 of the wires 2 to the position shown in FIG. 7. When the tips 70 of the wires 2 are situated at the first connector 14, the stuffer 12 approaches the applicator 10 from a location below the wires 2 such that the wires 2 are press-contacted onto the first connector 14, which is held by the applicator 10, as shown in FIG. 7. When the applicator 10, the movable wire guide 16, and the stuffer 12 return to their original positions, the press-contacting apparatus returns to the state shown in FIG. 1. By repeating the processes described above, wire harnesses which have two connectors 14 and 20 press-contacted to the ends of the wires 2 are manufactured.

It is important that the plurality of tips 70 of the wires 2 must be aligned prior to press-contacting of the wires 2 to the connector 14, once the wires 2 have been pulled back by the pullback clamp 4. This is because the tips 70 of the wires 2 are not arranged in a straight line. In the process illustrated in FIG. 6, the pitch converted wires 2 are not parallel when they are cut, but rather, the intervals between the wires 2 is variable as the wires 2 are spread out. That is, when the wires 2 are cut by the applicator 32, the length of wire from the movable wire guide 16 to the applicator 32 is longer for the wires 2 situated toward a front edge of the applicator 32 (see FIG. 5B). For this reason, the wires 2 are arranged such that those towards the front edge are longer with respect to the connector 14 when the wires 2 are pulled back by the pullback clamp 4.

Now, an end aligning mechanism 72 for aligning the tips 70 of the wires 2 will be described with reference to FIGS. 10–12.

Figure 10:
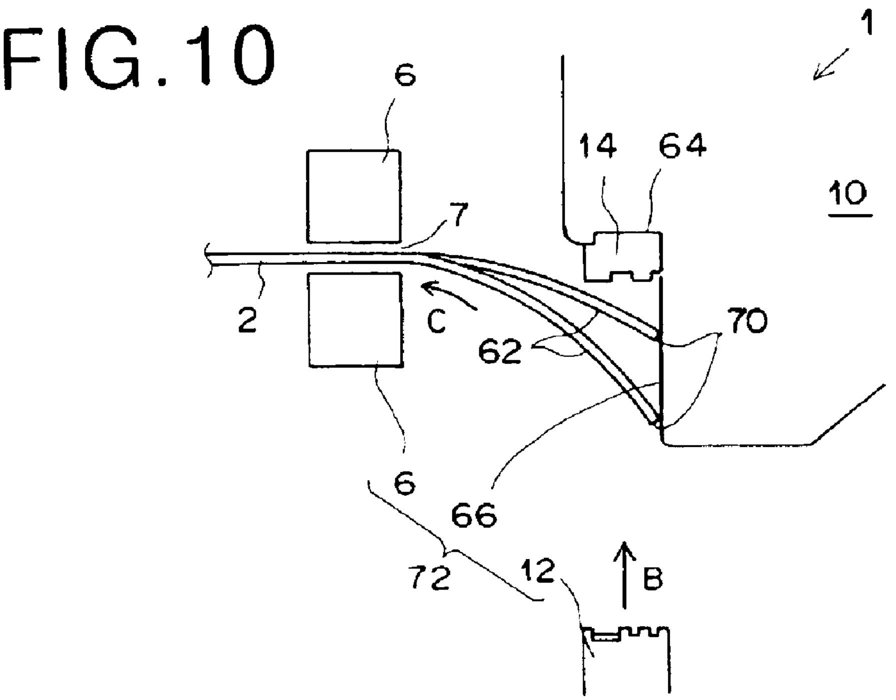
FIG. 10 is a schematic side view of an end aligning mechanism of the wire insulation displacement connection apparatus according to the present invention wherein the wires are not arranged in a straight line.

Referring first to FIG. 10, the applicator 10, also referred to as a connector holder, comprises a holding groove 64 for holding the connector 14, and a vertical surface 66 that extends perpendicular to and downward from the holding groove 64 and faces upstream. The wires 2 are movably guided in their axial directions by the fixed wire guide 6. End portions 62 of these wires 2 are substantially positioned in alignment with the connector 14; however, the tips 70 of the wires 2 are not aligned. Therefore, longer wires 2 abut the vertical surface 66 at positions further from the connector 14, while shorter wires 2 abut the vertical surface 66 at positions closer to the connector 14. With the wires 2 in this state, the stuffer 12 is driven in the direction of the arrow B indicated in FIG. 10 by the cylinder 18 (see FIG. 1) to perform the press-contact procedure. The vertical surface 66 of the applicator 10, the fixed wire guide (guide member) 6 and the stuffer 12 constitute the end aligning mechanism.

Figure 11:
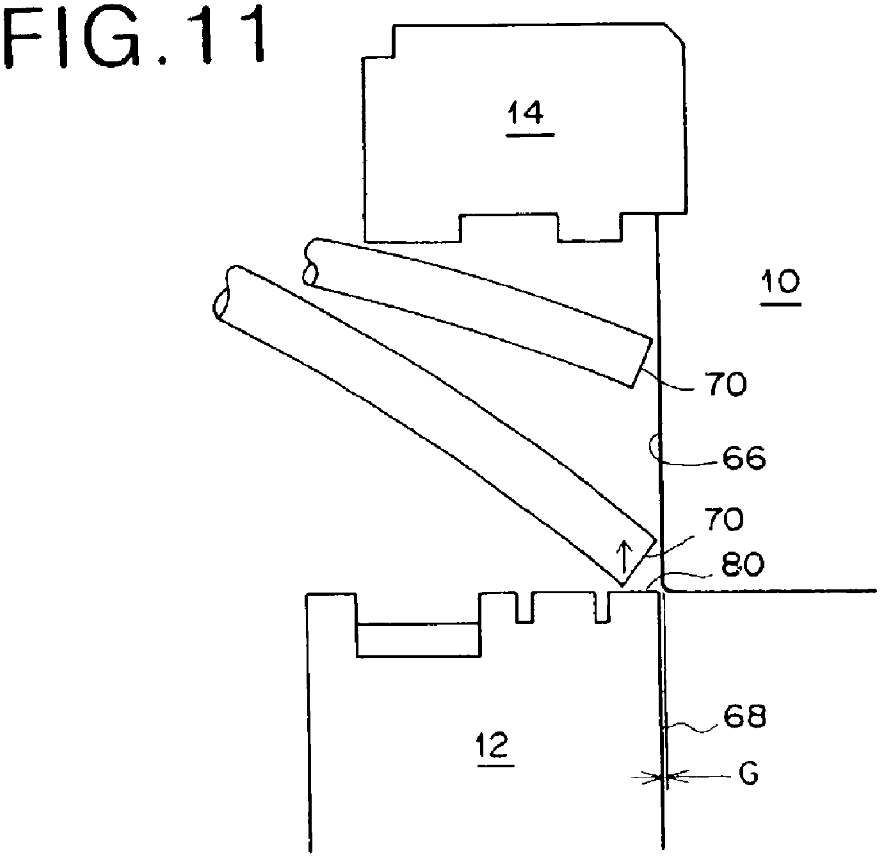
FIG. 11 is a schematic side view of the end aligning mechanism wherein the stuffer is beginning to push the tips of the wires towards the connector.

As shown in FIG. 11, the stuffer 12 begins to press the wires 2 along the vertical surface 66. The space between a side wall 68 of the stuffer 12 on the side of the vertical surface 66 and the vertical surface 66 is set to a narrow dimension of about 0.1 mm. Therefore, a pressing surface 80 of the stuffer 12, by moving vertically along the vertical surface 66, presses the end portions 62 that include the tips 70 of the wires 2 toward the connector 14. Accordingly, even if frictional resistance is generated from contact between the tips 70 and the vertical surface 66, no bending moment is generated, and it becomes possible to accurately and effectively press the tips 70 of the wires 2 into the terminals of the connector 14.

As the wires 2 are being pressed into connection with the connector 14, the excess lengths thereof are returned upstream in the longitudinal direction indicated by arrow C (see FIG. 10), while being guided by the guide grooves 7 of the fixed wire guide 6. When the wires 2 are at an appropriate length, the wires 2 are press-contacted to the connector 14 by the stuffer 12. In FIG. 12, the stuffer 12 is shown in its original position, that is, after the stuffer 12 has returned from press-contacting the tips 70 of the wires 2 into the engagement with the terminals of the connector 14.

Figure 12:
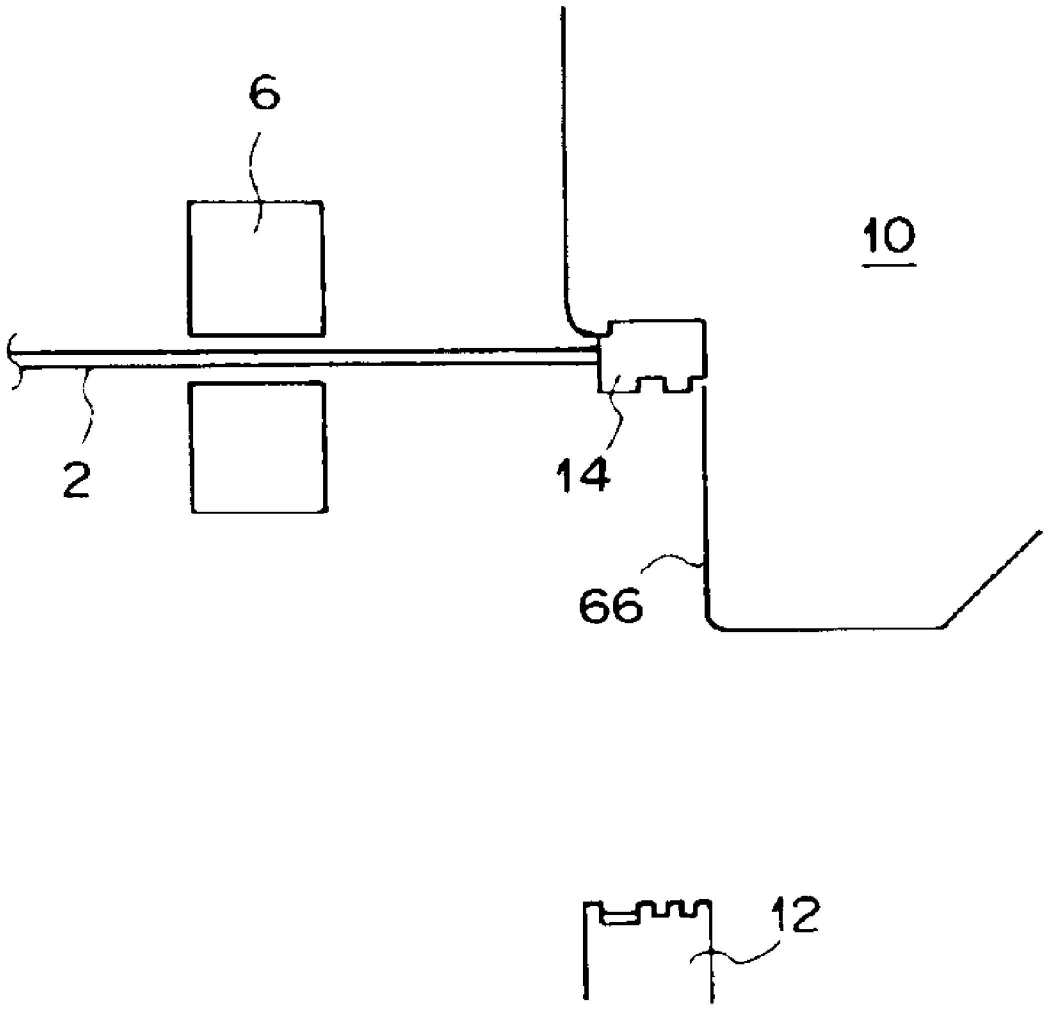
FIG. 12 is a schematic side view of the end aligning mechanism wherein the wires have been press-contacted onto the connector, thereby completing the connection therebetween.

The relative heights of the connector 14 and the wire holding position of the fixed wire guide 6 may be co-linear as shown in FIG. 12, or the wire holding position may be relatively higher than the connector 14. A state in which the wire holding position is higher than the connector 14 is defined as a state in which the fixed wire guide 6 is in a position higher than that shown in FIG. 12. That is, a state in which the fixed wire guide 6 is further from the stuffer 12 than the connector 14. The relative position of the connector 14 and wire holding position of the fixed wire guide 6 is important because if the wire holding position is lower than the connector 14, the wires 2 whose tips 70 have been aligned by the vertical surface 66, will flex such that the tips 70 face upward as a result of pressure by the stuffer 12. In view of this flexure, the tips 70 of the wires 2 reach the connector 14 at positions removed from the predetermined positions of press-contact portions (not shown) of the terminals of the connector 14 (towards the left with respect to FIG. 10). Therefore, wires 2 having a shorter length than that of the press-contact portions are positioned at the press-contact portions. In this case, there is a possibility that press-contact deficiencies will occur due to an insufficient length of wire being attached to the press-contact portions of the terminals. It is preferable that the amount of upward displacement (distance) of the wire holding portion with respect to the connector 14 is slight. By means of this structure, a sufficient length of the wires 2 can be arranged on the press-contact portions of the terminals of the connector 14. Therefore, the wires 2 can be securely and accurately press-contacted onto the terminals of the connector 14 without a possibility of a deficient press-contact.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A wire insulation displacement connection apparatus with a wire end alignment mechanism, comprising:

- a connector holder for holding a connector having terminals, said connector holder having a vertical surface;
- a press-contacting device being movable along said vertical surface of said connector holder for press-contacting tips of a plurality of wires to the terminals of the connector when the connector is held by said connector holder;
- a guide member being positionable adjacent said press-contacting device for guiding movement of the wires in their longitudinal direction as the end portions of the wires are pushed into the connector along said vertical surface by said press-contacting device;
- a wire end alignment mechanism for aligning the tips of the wires with the terminals of the connector;
- said vertical surface of said connector holder being arranged such that the tips of the wires abut said vertical surface when the tips of the wires are in alignment with the terminals of the connector; and,
- said press-contacting device being arranged to push end portions of the wires including the tips of the wires abutting said vertical surface into the connector along said vertical surface.

2. The wire insulation displacement connection apparatus with a wire end alignment mechanism as defined in claim 1, wherein said guide member includes a wire holding position arranged at the same height as the connector when held by said connector holder.

3. The wire insulation displacement connection apparatus with a wire end alignment mechanism as defined in claim 1, wherein said guide member includes a wire holding position arranged at a position higher than a position of the connector when held by said connector holder.

4. The wire insulation displacement connection apparatus with a wire end alignment mechanism as defined in claim 1, wherein said connector holder includes a groove for receiving the connector and said guide member includes a wire holding position arranged such that said wire holding position is at the same height as the connector when held in said groove of said connector holder.

5. The wire insulation displacement connection apparatus with a wire end alignment mechanism as defined in claim 1, wherein said connector holder includes a groove for receiving the connector and said guide member includes a wire holding position arranged such that said wire holding position is at a higher position than the position of the connector when held in said groove of said connector holder.

6. The wire insulation displacement connection apparatus with a wire end alignment mechanism as defined in claim 1, wherein said connector holder includes a groove for receiving the connector.

7. The wire insulation displacement connection apparatus with a wire end alignment mechanism as defined in claim 6, wherein said vertical surface of said connector holder extends perpendicularly downward from said groove and faces an upstream direction.

8. The wire insulation displacement connection apparatus with a wire end alignment mechanism as defined in claim 7, wherein said vertical surface of said connector holder faces upstream in a wire movement direction.

9. The wire insulation displacement connection apparatus with a wire end alignment mechanism as defined in claim 7, wherein said guide member is arranged upstream of said connector holder and said press-contacting device in a wire movement direction, said vertical surface of said connector holder facing said guide member.

10. The wire insulation displacement connection apparatus with a wire end alignment mechanism as defined in claim 1, wherein said guide member is arranged upstream of said connector holder and said press-contacting device in a wire movement direction, said vertical surface of said connector holder facing said guide member.

11. The wire insulation displacement connection apparatus with a wire end alignment mechanism as defined in claim 1, wherein said press-contacting device is a stuffer.

12. The wire insulation displacement connection apparatus with a wire end alignment mechanism as defined in claim 1, wherein said press-contacting device is arranged below said connector holder such that the wires pass between said connector holder and said press-contacting device.

13. The wire insulation displacement connection apparatus with a wire end alignment mechanism as defined in claim 1, wherein said guide member is fixed in position.

14. The wire insulation displacement connection apparatus with a wire end alignment mechanism as defined in claim 1, wherein said guide member includes guide grooves receivable of the wires and arranged to enable movement of the wires in the longitudinal direction.

15. The wire insulation displacement connection apparatus with a wire end alignment mechanism as defined in claim 1, wherein said connector holder and said press-contacting device are movable toward one another.

* * * * *